United States Patent [19]

Lubowitz et al.

[11] Patent Number: 4,868,270
[45] Date of Patent: Sep. 19, 1989

[54] HETEROCYCLE SULFONE OLIGOMERS AND BLENDS

[75] Inventors: Hyman R. Lubowitz, Rolling Hills Estates, Calif.; Clyde H. Sheppard, Bellevue; Ronald R. Stephenson, Kirkland, both of Wash.

[73] Assignee: The Boeing Company, Seattle, Wash.

[21] Appl. No.: 121,964

[22] Filed: Nov. 17, 1987

Related U.S. Application Data

[63] Continuation-in-part of Ser. No. 893,124, Aug. 4, 1986, abandoned, which is a continuation-in-part of Ser. No. 816,490, Jan. 6, 1986, abandoned, which is a continuation-in-part of Ser. No. 651,826, Sep. 18, 1984, abandoned.

[51] Int. Cl.$^4$ .............. C08F 75/32; C08F 73/22; C07D 403/14; C07D 413/14; C07D 417/14
[52] U.S. Cl. .............. 528/170; 524/494; 524/495; 528/289; 528/298; 528/322; 528/329.1; 548/156; 548/220; 548/328; 548/431; 548/435; 548/476; 548/547
[58] Field of Search .......... 524/494, 495; 528/170, 528/322, 329.1, 289, 298; 548/156, 220, 328, 431, 435, 476, 547

[56] References Cited

U.S. PATENT DOCUMENTS

| | | | |
|---|---|---|---|
| 3,267,081 | 8/1966 | Rudner et al. | 548/156 |
| 3,313,783 | 4/1967 | Iwakura et al. | 528/337 |
| 3,386,969 | 6/1968 | Levine | 528/289 |
| 3,689,464 | 9/1972 | Holub et al. | 528/322 |
| 3,729,446 | 4/1973 | Holub et al. | 528/170 |
| 3,748,311 | 7/1973 | Burns et al. | 528/228 |
| 3,812,159 | 5/1974 | Lubowitz | 528/295 |
| 3,839,287 | 10/1974 | Kwiatkowski et al. | 528/172 |
| 4,107,174 | 8/1978 | Baumann et al. | 548/547 |
| 4,110,188 | 8/1978 | Darms et al. | 528/322 |
| 4,134,895 | 1/1979 | Roth et al. | 548/431 |
| 4,187,364 | 2/1980 | Darms et al. | 526/259 |
| 4,200,731 | 4/1980 | Massey et al. | 525/437 |
| 4,239,883 | 12/1980 | Stenzenberger | 528/170 |
| 4,250,096 | 2/1981 | Kvita et al. | 548/476 |
| 4,423,202 | 12/1983 | Choe | 528/289 |
| 4,429,108 | 1/1984 | Stephens | 528/322 |
| 4,476,184 | 10/1984 | Lubowitz et al. | 528/170 |
| 4,476,295 | 10/1984 | Stephens | 528/322 |
| 4,536,559 | 8/1985 | Lubowitz et al. | 528/170 |
| 4,578,470 | 3/1986 | Webb | 546/256 |
| 4,584,364 | 4/1986 | Lubowitz et al. | 528/128 |
| 4,604,437 | 8/1986 | Renner | 528/322 |
| 4,728,742 | 6/1985 | Renner | 548/435 |
| 4,739,030 | 4/1988 | Lubowitz et al. | 548/435 |

FOREIGN PATENT DOCUMENTS

53-40760 4/1978 Japan.

OTHER PUBLICATIONS

Clyde Sheppard et al., "Novel High Temperature Matrix Materials", Int. SAMPE Symposium Exhib., 1986, 31 (Mater. Sir. Future) 1426-33 (Eng) (1986).

Primary Examiner—Veronica P. Hoke
Attorney, Agent, or Firm—Senniger, Powers, Leavitt and Roedel

[57] ABSTRACT

High thermal stabilities are achievable in linear or multidimensional sulfone, solvent resistant oligomers by incorporating oxazole, thiazole, or imidazole linkages into the oligomer backbone. Blended oligomers of crosslinking oligomers and noncrosslinking compatible polymers are also described. The oligomers include residues of four-functional compounds of the formula:

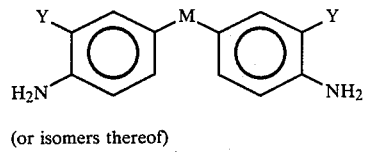

(or isomers thereof)

wherein
M=—CO—, —S—, —O—, —SO$_2$— or —(CF$_3$)$_2$C—; and
Y=—OH, —SH, or —NH$_2$.

In an improved method, the reactants are condensed at or below ambient temperature in the presence of pyridine in a suitable solvent such as N,N'-dimethylacetamide (DMAC).

33 Claims, No Drawings

4,868,270

HETEROCYCLE SULFONE OLIGOMERS AND BLENDS

REFERENCE TO RELATED APPLICATIONS

This application is a continuation-in-part application based upon U.S. Ser. No. 893,124, filed Aug. 4, 1986 now abandoned, which was a continuation-in-part application based on U.S. Ser. No. 816,490, filed Jan. 6, 1986 now abandoned, which was, in turn, a continuation-in-part application based upon U.S. Ser. No. 651,826, filed Sept. 18, 1984, now abandoned.

TECHNICAL FIELD

The present invention relates to crosslinkable oligomers that include oxazole, thiazole, or imidazole linkages along the oligomer backbone between mono- or difunctional crosslinking end-cap phenylimides, and to oligomer/polymer blends. The oligomers or blends are curable into composites (from prepregs) that exhibit improved solvent-resistance and that have physical properties suitable for high performance, advance composites. The heterocycles include an electronegative (i.e. "sulfone") linkage on either side of each oxazole, thiazole, or imidazole linkage.

BACKGROUND ART

Recently, chemists have sought to synthesize oligomers for high performance advanced composites suitable for aerospace applications. These composites should exhibit solvent resistance, be tough, impact resistant, and strong, be easy to process, and be thermoplastic. Oligomers and composites that have thermo-oxidative stability, and, accordingly can be used at elevated temperatures, are particularly desirable.

While epoxy-based composites are suitable for many applications, their brittle nature and susceptibility to degradation make them inadequate for many aerospace applications, especially those applications which require thermally stable, tough composites. Accordingly, research has recently focused upon polyimide composites to achieve an acceptable balance between thermal stability, solvent resistance, and toughness. The maximum use temperatures of conventional polyimide composites, such as PMR-15, are still only about 600°–625° F., since they have glass transition temperatures of about 690° F.

Linear polysulfone, polyether sulfone, polyester, and polyamide systems are also known, but each of these systems fails to provide as high thermal stability as is required in some aerospace applications.

There has been a progression of polyimide sulfone compounds synthesized to provide unique properties or combinations of properties. For example, Kwiatkowski and Brode synthesized maleic-capped, linear polyarylimides as disclosed in U.S. Pat. No. 3,839,287. Holub and Evans synthesized maleic- or nadic-capped, imido-substituted polyester compositions as disclosed in U.S. Pat. No. 3,729,446. We synthesized thermally stable polysulfone oligomers as disclosed in U.S. Pat. No. 4,476,184 or 4,536,559, and have continued to make advances with polyetherimidesulfones, polybenzoxazolesulfones (i.e., heterocycles), polybutadienesulfones, and "star" or "star-burst" multidimensional oligomers. We have shown surprisingly high glass transition temperatures and desirable physical properties in many of these oligomers and their composites, without losing ease of processing.

Multidimensional oligomers, such as disclosed in our copending applications U.S. Ser. Nos. 726,258; 810,817; and 000,605, all now abandoned, are easier to process than many other advanced composite oligomers since they can be handled at lower temperatures. Upon curing, however, the unsaturated phenylimide end caps crosslink so that the thermal resistance of the resulting composite is markedly increased with only a minor loss of stiffness, matrix stress transfer (impact resistance), toughness, elasticity, and other mechanical properties. Glass transition temperatures above 950° F. are achievable.

Commercial polyesters, when combined with well-known diluents, such as styrene, do not exhibit satisfactory thermal and oxidative resistance to be useful for aircraft or aerospace applications. Polyarylesters are unsatisfactory, also, since the resins often are semicrystalline which makes them insoluble in laminating solvents, intractable in fusion, and subject to shrinking or warping during composite fabrication. Those polyarylesters that are soluble in conventional laminating solvents remain so in composite form, thereby limiting their usefulness in structural composites. The high concentration of ester groups contributes to resin strength and tenacity, but also makes the resin susceptible to the damaging effects of water absorption. High moisture absorption by commercial polyesters can lead to distortion of the composite when it is loaded at elevated temperature.

High performance, aerospace, polyester advanced composites, however, can be prepared using crosslinkable, endcapped polyester imide ether sulfone oligomers that have an acceptable combination of solvent resistance, roughness, impact resistance, strength, ease of processing, formability, and thermal resistance. By including Schiff base (—CH=N—), imidazole, thiazole, or oxazole linkages in the oligomer chain, the linear, advanced composites formed with polyester oligomers of our copending application U.S. Ser. No. 726,259 can have semiconductive or conductive properties when appropriately doped.

Conductive and semiconductive plastics have been extensively studied (see, e.g., U.S. Pat. Nos. 4,375,427; 4,338,222; 3,966,987; 4,344,869; and 4,344,870), but these polymers do not possess the blend of properties which are essential for aerospace applications. That is, the conductive polymers do not possess the blend of (1) toughness, (2) stiffness, (3) elasticity, (4) ease of processing, (5) impact resistance (and other matrix stress transfer capabilities), (6) retention of properties (over a broad range of temperatures), and (7) high temperature resistance that is desirable on aerospace advanced composites. These prior art composites are often too brittle.

Thermally stable multidimensional oligomers having semiconductive or conductive properties when doped with suitable dopants are also known and are described in our copending applications (including U.S. Ser. No. 773,381 to Lubowitz, Sheppard, and Torre). The linear arms of the oligomers contain conductive linkages, such as Schiff base (—N=CH—) linkages, between aromatic groups. Sulfone and ether linkages are interspersed in the arms. Each arm is terminated with a mono- or difunctional end cap (i.e., a radical having one or two crosslinking sites) to allow controlled crosslinking upon heat-induced or chemically-induced curing.

Polyamides of this same general type are described in our copending patent application U.S. Ser. No. 061,938; polyetherimides, in U.S. Ser. No. 016,703; and polyamideimides, in U.S. Ser. No. 092,740 now abandoned.

SUMMARY OF THE INVENTION

The present invention relates to oxazole, thiazole, and imidazole oligomers, particularly benzoxazole, benzothiazole, and benzimidazole oligomers, capped with mono- or difunctional end-cap monomers (to provide one or two crosslinking sites) to achieve superior thermal stability while retaining desirable strength and processing physical properties. Increased toughness is achieved by using electronegative linkages, like $-SO_2-$, on either side of the heterocycle linkages.

The linear heterocycle sulfone oligomers are usually prepared by the condensation of:

(a) 2 moles of a phenylimide carboxylic acid halide end-cap monomer of the general formula:

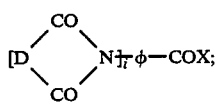

wherein
  D = a divalent radical that includes hydrocarbon unsaturation;
  i = 1 or 2; and
  φ = phenyl (b) n moles of a diacid halide, particularly an aromatic diacid halide having a plurality of aryl groups linked by "sulfone" linkages; and (c) (n+1) moles of a four-functional "sulfone" compound of the formula:

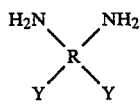

wherein R has the formula:

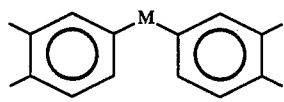

M = $-CO-$, $-SO_2-$, $-(CF_3)_2C-$, $-S-$, or $-O-$; and
Y = $-OH$, $-SH$, or $-NH_2$. Isomers of the four-functional compound may also be used so long as the isomers include two pairs of an amine and a "Y" functionality on adjacent carbons on an aromatic radical.

The end-cap monomer preferably is selected from the group consisting of:

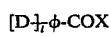

wherein D =

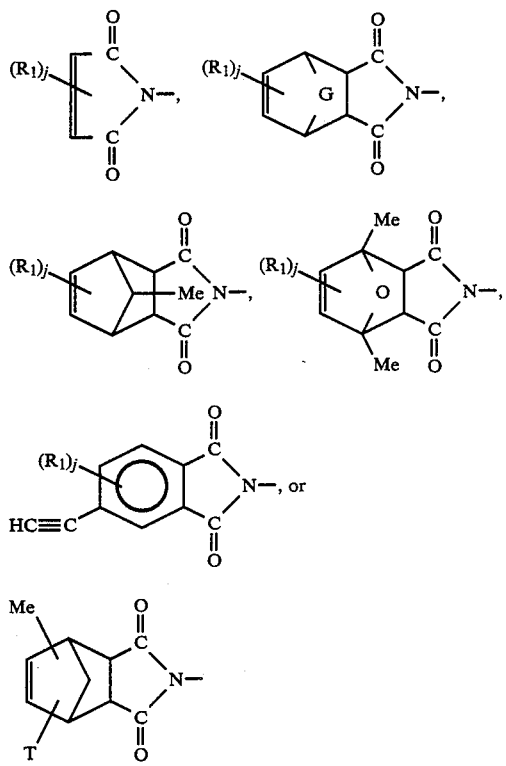

$R_1$ = lower alkyl, aryl, substituted aryl (including hydroxyl or halo-substituents), lower alkoxy, aryloxy, halogen, or mixtures thereof (preferably lower alkyl);
X = halogen, preferably Cl;
i = 1 or 2;
j = 0, 1, or 2;
G = $-CH_2-$, $-O-$, $-S-$, or $-SO_2-$
φ = phenyl;
T = methallyl or allyl; and
Me = methyl. Preferred end-cap monomers are the phenylimide halides wherein D =

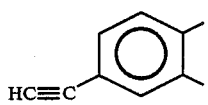

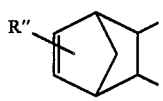

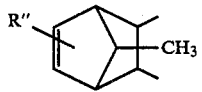

wherein R" is hydrogen or lower alkyl.

Preferred oligomers have an average formula weight between about 500 and about 30,000; more preferably, between about 1,000 to 20,000; and most preferably, between about 1,000 to 5,000.

The oligomers are made by condensing the reactants from a three component mixture in a suitable solvent under an inert atmosphere.

Blended oligomers are prepared to include the crosslinking oligomers and a compatible polymer that usually has a comparable or a substantially identical backbone, but that is terminated or quenched with a monomer that is unable to crosslink when the blend is heated or treated with chemical curing initiators (such as organic peroxides). Accordingly, the comparable oligomer usually is prepared by condensing:

(a) 2 moles of an acid halide momomer;
(b) n moles of the diacid halide of the crosslinking oligomer;
(c) (n+1) moles of the four-functional "sulfone" reactant of the crosslinking oligomer, wherein n≧1. A suitable monomer for quenching the polymerization reaction for the comparable oligomer is benzoic acid halide

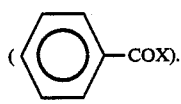

Of course, the oligomers can also be prepared by the condensation of:
(a) 2 moles of a suitable phenylimide amine, phenol, or thiol (sulfhydryl) monomer;
(b) n moles of a four-functional compound; and
(c) (n+1) moles of a suitable diacid halide.

The compatible polymer in this case would also usually include the analogous backbone and could be quenched with a phenol compound or suitable thio- or amino-monomer (such as aniline).

Oligomers of this general type are easily processed into prepregs and composites. The composites (or laminates) are chemically, thermally, and dimensionally stable, are tough, can withstand relatively high temperatures, and are resistant to solvents generally found in aerospace applications.

An improved method for synthesizing these oligomers in the presence of pyridine is also described and claimed.

BEST MODE CONTEMPLATED FOR CARRYING OUT THE INVENTION

The crosslinking oligomers of the present invention are oxazoles, thiazoles, or imidazoles prepared by the condensation of:
(a) 2 moles of an unsaturated phenylimide carboxylic acid halide end-cap monomer;
(b) n moles of a diacid haide, particularly an aromatic diacid halide having a plurality of aryl groups linked by "sulfone" (i.e. electronegative) linkages; and
(c) (n+1) moles of a four-functional "sulfone" compound of the formula:

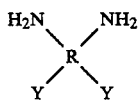

wherein R is a hybrocarbon radical selected from the group consisting of:

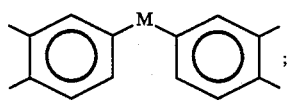

$M = -CO-$, $SO_2-$, $-(CF_3)_2C-$, $-S-$, or $-O-$; and
$Y = -OH$, $-SH$, or $-NH_2$.

The end-cap monomer generally is selected from the group consisting of:

wherein D =

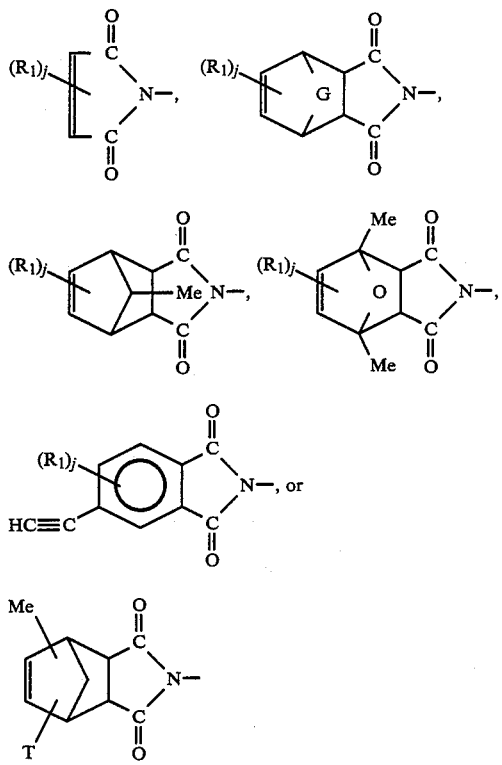

$R_1$ = lower alkyl, aryl, substituted aryl (including hydroxyl or halo-substituents), lower alkoxy, aryloxy, halogen, or mixtures thereof (preferably lower alkyl);
X = halogen;
φ = phenyl;
G = $-O-$, $-S-$, $-SO_2-$ or $-CH_2-$;
i = 1 or 2;
j = 0, 1, or 2;
T = methallyl or allyl; and
Me = methyl. The unsaturation provides a crosslinking site upon thermal or chemical curing to form a composite.

Particularly preferred end-caps (for the highest thermal stability) include:

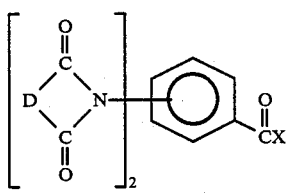

wherein D =

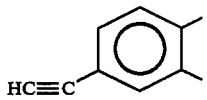

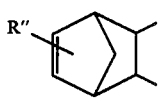

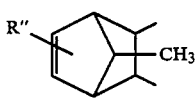

and R" is hydrogen or lower alkyl.

The reaction is generally carried out at ambient conditions or below under an inert atmosphere (dry N₂ purge) in a suitable solvent including an excess of base (pyridine) to eliminate the possibility of undesirable side reactions that might otherwise occur in an acidic solution. Pyridine is preferred over other bases, such as NaOH or KOH.

The dicarboxylic acid halide (or dicarboxylic acid) may include an aromatic chain segment selected from the group consisting of:
(a) phenyl;
(b) naphthyl;
(c) biphenyl;
(d) a polyaryl "sulfone" divalent radical of the general formula:

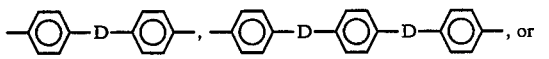

wherein
D=—S—, —O—, —CO—, —SO₂—, —(CH₃)₂C—, —(CF₃)₂C—, or mixtures thereof throughout the chain; or (e) a divalent radical having conductive linkages, illustrated by Schiff base compounds selected from the group consisting of:

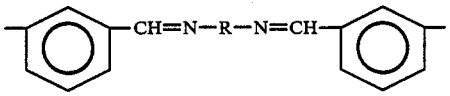

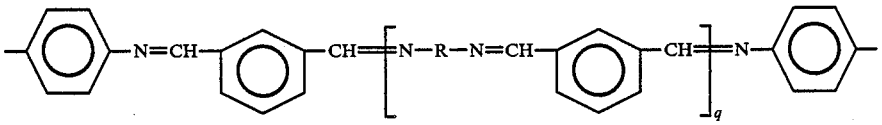

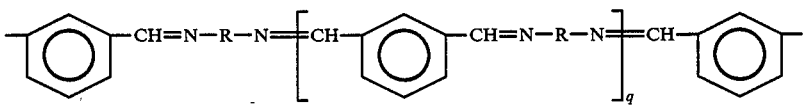

wherein R is selected from the group consisting of: phenyl; biphenyl; naphthyl; or a divalent radical of the general formula:

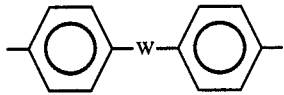

wherein W=—SO₂— or —CH₂—; and q=0-4; or (f) a divalent radical of the general formula:

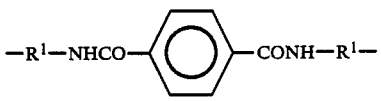

wherein $R^1$=a $C_2$ to $C_{12}$ divalent aliphatic, alicyclic, or aromatic radical, and, preferably, phenyl (as described in U.S. Pat. No. 4,556,697).

Thiazole, oxazole, or imidazole linkages, especially between aryl groups, may also be used instead of the Schiff base linkages. The oligomers, already being heterocycles, may be semiconductive upon doping even without incorporating additional conductive linkages.

The diacid halide (i.e. dicarboxylic acid halide or the acid) then is preferably selected from the group consisting of:

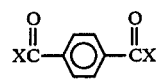

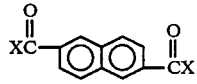

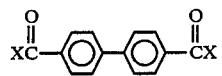

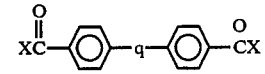

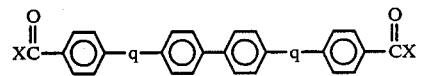

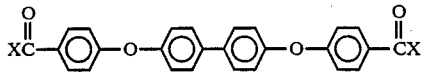

-continued

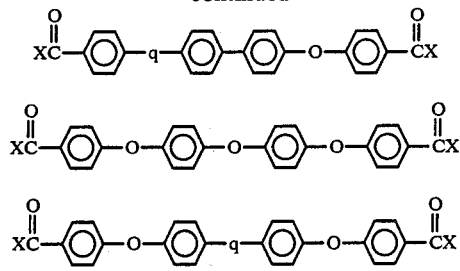

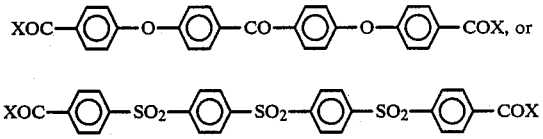

-continued

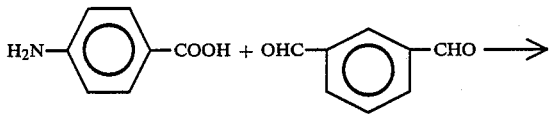

Schiff base dicarboxylic acids and diacid haides can be prepared by the condensation of aldehydes and aminobenzoic acid (or other amine acids) in the general reaction scheme:

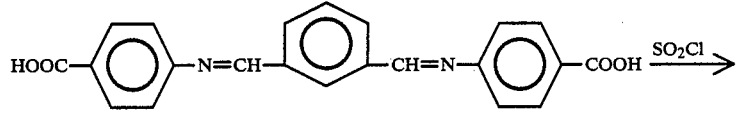

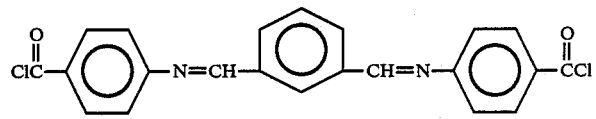

or similar syntheses.

Other diacid halides that can be used, but that are not preferred, are disclosed in U.S. Pat. No. 4,504,632, and include: adipylchloride, malonyl chloride, succinyl chloride, glutaryl chloride, pimelic acid dichloride, suberic acid dichloride, azelaic acid dichloride, sebacic acid dichloride, dodecandioic acid dichloride, phthaloyl chloride, isophthaloyl chloride, terephthaloyl chloride, 1,4-naphthalene dicarboxylic acid dichloride, and 4,4'-diphenylether dicarboxylic acid dichloride.

Polyaryl or aryl diacid halides are preferred to achieve the highest thermal stabilities in the resulting oligomers and composites because aliphatic bonds are not as thermally stable as aromatic bonds. Particularly preferred compounds include intermediate "sulfone" (i.e. electronegative) linkages to improve the toughness of the resulting oligomers. For purposes of this description, "sulfone" linkages should be understood to include —SO$_2$—, —S—, —CO—, and —(CF$_3$)$_2$C—, unless clearly limited to only —SO$_2$—.

Suitable diacid halides include compounds made by reacting nitrobenzoic acid with a bisphenol (i.e., dihydric phenol, dialcohol, or diol). The bisphenol is preferably selected from the group consisting of: 2,2-bis-(4-hydroxyphenyl)-propane (i.e., bisphenol-A); bis-(2-hydroxyphenyl)-methane; bis-(4-hydroxyphenyl)-methane; 1,1-bis-(4-hydroxyphenyl)-ethane; 1,2-bis-(4-hydroxyphenyl)-ethane; 1,1-bis-(3-chloro-4-hydroxyphenyl)-ethane; 1,1-bis-(3,5-dimethyl-4-hydroxyphenyl)-ethane; 2,2-bis-(3-phenyl-4-hydroxyphenyl)-

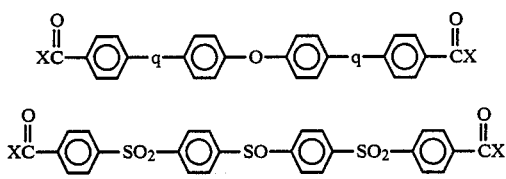

wherein q is —CO—, —S—, —(CF$_3$)$_2$C—, or —SO$_2$—, and, most preferably, —CO— or —SO$_2$—, and acid halides represented by the formula:

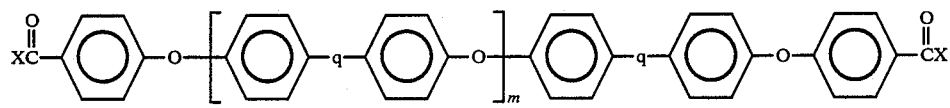

wherein q=an electronegative ("sulfone") linkage (—SO$_2$—, —S—, —CO—, or —(CF$_3$)$_2$C—) as previously defined, and m=an integer, generally from 1–5.

The most preferred acid halides include:

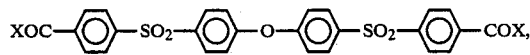

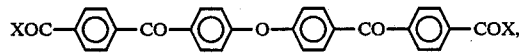

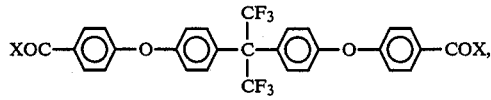

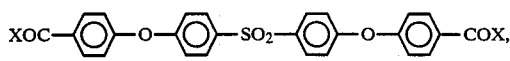

propane; 2,2-bis-(4-hydroxynaphthyl)-propane 2,2-bis-(4-hydroxyphenyl)-pentane; 2,2-bis-(4-hydroxyphenyl)-hexane; bis-(4-hydroxyphenyl)-phenylmethane; bis-(4-hydroxyphenyl)-cyclohexylmethane; 1,2-bis-(4-hydroxyphenyl)-1,2-bis-(phenyl)-ethane; 2,2-bis-(4-hydroxyphenyl)-1-phenylpropane; bis-(3-nitro-4-hydrophenyl)-methane; bis-(4-hydroxy-2,6-dimethyl-3-methoxyphenyl)-methane; 2,2-bis-(3,5-dichloro-4-hydroxyphenyl)-propane; 2,2-bis-(3-bromo-4-hydroxyphenyl)-propane; or mixtures thereof, as disclosed in U.S. Pat. No. 3,262,914. Bisphenols having aromatic character (i.e., absence of aliphatic segements), such as bisphenol-A, are preferred.

The bisphenol may be in phenate form, or a corresponding sulfyhydryl can be used. Of course, mixtures of bisphenols and disulfhydryls can be used.

Other suitable bisphenols are described in our co-pending applications 016,703 and 726,258; or in U.S. Pat. Nos. 4,584,364; 4,661,604; 3,262,914, or 4,611,048.

While bisphenol-A ispreferred (because of cost and availability), the other bisphenols can be used to add rigidity to the oligomer without significantly increasing the average formula weight, and therefore, can increase the solvent resistance. Random or block copolymers are possible.

Bisphenols of the type described are commercially available. Some may be easily synthesized by reacting dihalogen intermediate with bis-phenates, such as the reaction of 4,4'-dichlorophenyl-sulfone with bis(-disodium biphenolate). Preferred dihalogens in this circumstance are selected from the group consisting of:

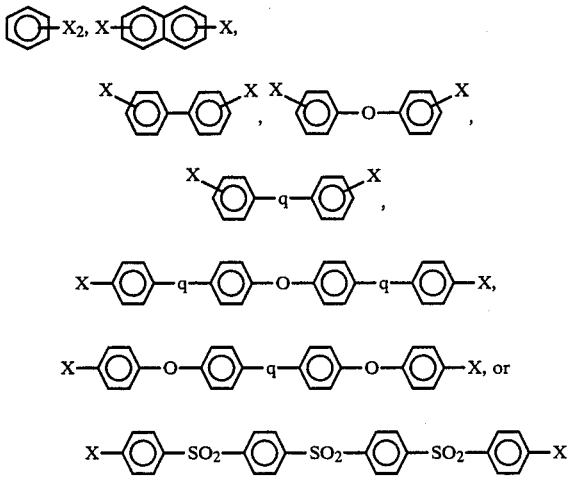

wherein
X=halogen, preferably chlorine; and
q=—S—, —SO$_2$—, —(CO—, —(CH$_3$)$_2$C—, and —(CF$_3$)$_2$C—, and preferably either —SO$_2$— or —CO—.

The heterocycle oligomers of the present invention can also be prepared by the condensation of:
(a) 2 moles of a crosslinking phenylimide amine, phenol, or sulfhydryl end-cap monomer;
(b) n moles of the four-functional compound; and
(c) (n+1) moles of a suitable diacid halide.

In this case, the end-cap monomer generally has the formula:

$$[D]_i\text{-}\phi\text{-Y}$$

wherein D, i, and $\phi$ are as previously defined and Y=—OH, —SH, or —NH$_2$.

Blends can improve impact resistance of composites without causing a significant loss of solvent resistance. The blends comprise mixtures of one or more crosslinkable oligomer and one or more polymer that is incapable of crosslinking. Generally, the blends comprise substantially equimolar amounts of one polymer and one oligomer having substantially identical backbones. The crosslinkable oligomer and compatible polymer can be blended together by mixing mutually soluble solutions of each. While the blend is preferably equimolar in the oligomer and polymer, the ratio of the oligomer and polymer can be adjusted to achieve the desired physical properties.

Although the polymer in such a blend usually has the same length backbone as the oligomer, the properties of the composite formed from the blend can be adjusted by altering the ratio of formula weights for the polymer and oligomer. The oligomer and polymer generally have substantially identical repeating units, but the oligomer and polymer merely need be compatible in the solution prior to sweeping out as a prepreg. Of course, if the polymer and oligomer have identical backbones, compatibility in the blend is likely to occur. Blends that comprise relatively long polymers and relatively short oligomers (i.e., polymers having higher average formula weights than the oligomers) prior to curing are preferred, since, upon curing, the oligomers will effectively increase in MW by crosslinking.

In synthesizing the comparable polymers, quenching end caps can be employed, if desired, to regulate the polymerization of the comparable polymer, so that it has an average formula weight substantially identical with the crosslinkable oligomer. For thermal stability, an aromatic compound, such as aniline or benzoic acid chloride, is preferred to quench the synthesis.

Solvent resistance may decrease markedly if the comparable polymer is provided in large excess to the crosslinkable oligomer in the blend.

The blends will generally comprise a mixture of a heterocycle oligomer and the same heterocycle polymer (i.e., oxazole oligomer and oxazole polymer). The polymer may, however, be a different heterocycle, such as an imide, imidazole, or thiazole. The mixture may include several types of oligomers or several types of polymers, such as a three component mixture of an oxazole oligomer, a thiazole oligomer, and an imidazole polymer.

The blends may be semi-interpenetrating networks of the general type described by Egli et al. "Semi-Interpenetrating Networks of LARC-TPI" available from NASA-Langley Research Center.

The average formula weight of the preferred crosslinking oligomers ranges between about 500 and about 30,000; preferably between about 1,000 and about 20,000; and (for thermosetting compositions) still more preferably between about 1,000 and 5,000. Mixtures of crosslinking oligomers having molecular weights within these ranges may also be used, for example, a mixture of an oligomer having a molecular weight of about 1,000 with an oligomer having a molecular weight of about 20,000, or a mixture of an oligomer with a molecular weight of about 5,000 with an oligomer having a molecular weight of about 10,000 or about 20,000. Within the described ranges, the oligomers can be crosslinked to form solvent resistant composites of high thermal stability suitable for many aerospace applications. The oligomers, however, are relatively soluble, and, therefore, may be easily processed into prepregs by conventional steps.

Generally, for making linear heterocycles, the diacid halide is selected from the group consisting of:

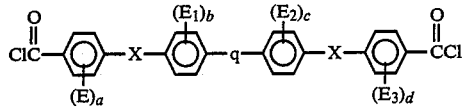

wherein q is selected from the group consisting of $-(CF_3)_2C-$, $-SO_2-$, $-S-$, or $-CO-$; X is selected from the group consisting of $-O-$ or $-SO_2-$; E, $E_1$, $E_2$ and $E_3$ each represent substituent groups selected from the group consisting of halogen, alkyl groups having 1 to 4 carbon atoms, and alkoxy groups having 1 to 4 carbon atoms, and "a," "b," "c," and "d" are all integers having values from 0 to 4.

The compound:

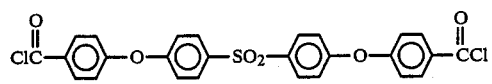

is particularly preferred, especially if the end-cap monomer is either:

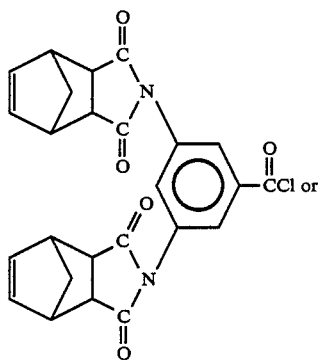

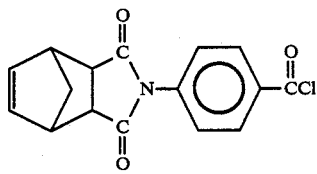

Prepregs and composites of these oligomers can be prepared by conventional techniques. Suitable prepreging reinforcements include ceramic, organic (including KEVLAR), carbon, and glass fibers in continuous, woven or chopped form. The composites may be cured from prepregs or might be filled oligomers. Curing temperatures might be somewhat higher than those used on commodity oligomers, but the curing process will be readily understood by those of ordinary skill in the art.

The four-functional compounds and diacid halides are commercially available from Hoescht or Burdick & Jackson, or are readily prepared from these commercial compounds.

Multidimensional oligomers may be synthesized using an aromatic hub, such as cyuranic acid (or its acid halide), the four-functional compounds, and the acid halide end-cap monomers. The oligomers have the general formula:

$$AR(T)_w$$

wherein
Ar = the aromatic hub residue;
T = a monovalent radical having at least two heterocyclic (oxazole, thiazole, or imidazole) linkages, at least one "sulfone" linkage, and at least one terminal, crosslinking functionality thereby having the general formula:

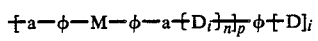

wherein M, D, $\phi$, and i are as previously defined;
a = a heterocycle linkage;
$D_1$ = a residue of a diacid halide;
p = an integer, generally from 1-5, and
n = 0 or 1, if p = 1, or 1, if p > 1; and
w = an integer greater than or equal to 3, and preferably 3 or 4.

The chains can be further extended by including a diacid halide residue bonded to the hub.

In multidimensional oligomers, an aromatic hub includes a plurality of rays or spokes radiating from the hub in the nature of a star to provide multidimensional crosslinking through suitable terminal groups with a greater number (i.e. higher density) of crosslinking bonds than linear arrays provide. Usually the hub will have three radiating chains to form a "Y" pattern. In some cases, four chains may be used. Including more chains leads to steric hindrance as the hub is too small to accommodate the radiating chains. A trisubstituted phenyl hub is highly preferred with the chains being symmetrically placed about the hub. Biphenyl, naphthyl, or azaline (e.g., melamine) may also be used as the hub radical along with other aromatic moieties, if desired.

Triazine derivatives can be used as the hub. These derivatives are described in U.S. Pat. No. 4,574,154 and have the general formula:

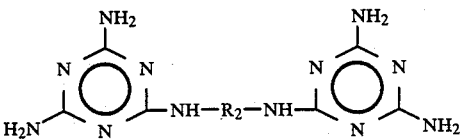

wherein $R_2$ is a divalent hydrocarbon residue containing 1-12 carbon atoms (and, preferably, ethylene) by reacting the amine functionalities with phthalic acid anhydride to form arms that include imide linkages and terminal acid functionalities (that can be converted to acid halides, if desired). The triazine derivatives of U.S. Pat. No. 4,617,390 (or the acid halides) can also be used as the hub.

Hubs suitable for making multidimensional, heterocycle oligomers of the present invention can be made by reacting polyol aromatic hubs, such as phloroglucinol, with nitrobenzoic acid or nitrophthalic acid to form ether linkages and active, terminal carboxylic acid functionalities. The nitrobenzoic acid products would have three active sites while the nitrophthalic acid products would have six; each having the respective formula:

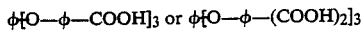

wherein $\phi$=phenyl. Of course other nitro/acids can be used.

Hubs can also be formed by reacting the corresponding halo-hub (such a tribromobenzene) with aminophenol to form triamine compounds represented by the formula:

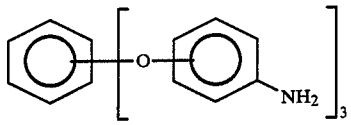

which can then be reacted with an acid anhydride to form a polycarboxylic acid of the formula:

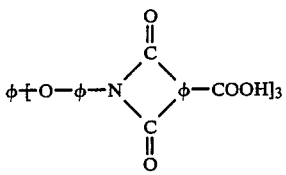

wherein $\phi$=phenyl; the hub being characterized by an intermediate ether and imide linkage connecting aromatic groups. Thio-analogs are also contemplated, in accordance with U.S. Pat. No. 3,933,862.

Phenoxyphenyl sulfone arms radiating from a hub with either an amine or carboxylic acid are also precursors for making multidimensional heterocycle oligomers of the present invention.

The best results are likely to occur when the hub is cyanuric acid, and when a four-functional compound and end-cap monomer are reacted with the hub to form a short armed oligomer having three or six crosslinking sites. These compounds are the simplest multidimensional oligomers and are relatively inexpensive to synthesize.

Blends of the multidimensional oligomers, comparable to the blends of linear oligomers, can also be prepared, as will be understood.

The oligomers can be synthesized in a homogeneous reaction scheme wherein all the reactants are mixed at one time, or in a stepwise reaction scheme wherein the radiating chains are affixed to the hub and the product of the first reaction is subsequently reacted with the end cap groups. Of course, the hub may be reacted with end-capped arms that include one reactive, terminal functionality for linking the arm to the hub. Homogeneous reaction is preferred, resulting undoubtedly in a mixture of oligomers because of the complexity of the reactions. The products of the processes (even without distillation or isolation of individual species) are preferred oligomer mixtures which can be used without further separation to form the desired advanced composites.

If the linear or multidimensional oligomers include Schiff base or other conductive linkages, the composites may be conductive or semiconductive when suitably doped. The dopants are preferably selected from compounds commonly used to dope other polymers, namely, (1) dispersions of alkali metals (for high activity) or (2) strong chemical oxidizers, particularly alkali perchlorates (for lower activity). Arsenic compounds and elemental halogens, while active dopants, are too dangerous for general usage, and are not recommended.

The dopants apparently react with the oligomers or polymers to form charge transfer complexes. N-type semiconductors result from doping with alkali metal dispersions. P-type semiconductors result from doping with elemental iodine or perchlorates. Dopant should be added to the oligomer or blend prior to forming the prepreg.

While research into conductive or semiconductive polymers has been active, the resulting compounds (mainly polyacetylenes, polyphenylenes, and polyvinylacetylenes) are unsatisfactory for aerospace applications because the polymers are:

(a) unstable in air;
(b) unstable at high temperatures;
(c) brittle after doping;
(d) toxic because of the dopants; or
(e) intractable.

These problems are overcome or significantly reduced with the conductive oligomers of the present invention.

While conventional theory holds that semiconductive polymers should have (1) low ionization potentials, (2) long conjugation lengths, and (3) planar backbones, there is an inherent trade-off between conductivity and toughness or processibility, if these constraints are followed. To overcome the processing and toughness shortcomings common with Schiff base, oxazole, imidazole, or thiazole polymers, the oligomers of the present invention generally include "sulfone" linkages interspersed along the backbone providing a mechanical swivel for the rigid, conductive segments of the arms.

Because the heterocycle (oxazole, thiazole, or imidazole) linkages are themselves within the family of conductive or semiconductive linkages, it may be unnecessary to include Schiff base linkages to achieve conductive or semiconductive properties upon doping. That is, conductive or semiconductive properties might be achieved simply be doping the oxazole, thiazole, or imidazole oligomers.

Linear or multidimensional oligomers can be synthesized from a mixture of four or more reactants so that extended chains may be formed. Adding components to the reaction mixture, however, adds to the complexity of the reaction and of its control. Undesirable competitive reactions may result or complex mixtures of macromolecules having widely different properties may be formed, because the chain extenders and chain terminators are mixed, and compete with one another.

While para isomerization is shown for all of the reactants, other isomers are possible. Furthermore, the aryl groups can have substituents, if desired, such as halogen, lower alkyl up to about 4 carbon atoms, lower alkoxy up to about 4 carbon atoms, or aryl. Substituents may create steric hindrance problems in synthesizing the oligomers or in crosslinking the oligomers into the final composites.

The heterocycle oligomers of the present invention are distinguished from those of our earlier applications by the four-functional compounds. Here, those compounds include an intermediate "sulfone" linkage to provide a mechanical swivel within the backbone or the oligomers. Because the heterocycle linkages are rigid or stiff, the incorporation of these electronegative ("sulfone") linkages improves the toughness of the resulting composites without significant decrease of the other physical properties. While our heterocycles in general are improvements over pure heterocycles by the use of electronegative linkages in the diacid halide residues, the special subclass of the present invention is believed to provide even betteer physical properties beneficial for structural aerospace applications. On either side of the rigid heterocycle linkages in the backbone, the electronegative ("sulfone") linkages provide stress relief. Our earlier heterocycle oligomers did not necessarily include an electronegative linkage within the four-functional compound.

Prepregs of the oligomers or blends can be prepared by conventional techniques. While woven fabrics are the typical reinforcement, the fibers can be continuous or discontinuous (in chopped or whisker form) and may be ceramic, organic, carbon (graphite), or glass, as suited for the desired application.

Composites can be formed by curing the oligomers or prepregs in conventional vacuum bag techniques. The oligomers can also be used as adhesives, varnishes, films, or coatings.

The following examples are presented to illustrate various features of the invention.

EXAMPLE I

Synthesis of bis(3-methylphenoxyphenyl)sulfone

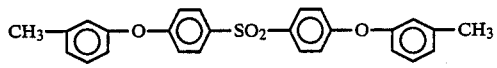

A one liter bottle fitted with a stirrer, thermometer, Barrett, condenser, and nitrogen inlet tube was charged with 88.3 grams (0.82 moles) of m-cresol, 286.6 grams of dimethyl sulfoxide (DMSO), 134.8 grams of toluene, and 65.3 grams of a 50% NaOH solution. The mixture was heated to 127° C. and the water was removed. The mixture was then heated to 165° C. to remove the toluene, and was cooled to 110° C. before adding 111.7 grams (0.39 moles) of dichlorodiphenylsulfone. The mixture was heated for 4 hours at 141° C., before the mixture was poured into 3 liters of water to crystalize an intermediate. The water was decanted, and 1 liter of 2-propanol was added. This mixture was heated until the majority of the product dissolved. The product was recrystallized, recovered by filtration, washed with 3 liters of water followed by 500 ml of 2-propanol, and dried. 167.4 grams of a bis(2-methylphenoxyphenyl)sulfone product resulted. The melting point ranged from 83°–85° C.

EXAMPLE II

Synthesis of bis(3-carboxyphenoxyphenyl)sulfone

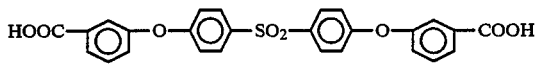

A reaction flask fitted with a stirrer, condenser, thermometer, and $N_2$ purge was charged with 100 grams of the product of Example I, 775 grams of pyridine, and 155 grams of water. The mixture was refluxed and oxidized with 49 grams of $KMnO_4$, filtered to recover the intermediate to which 775 grams of 1.8N NaOH solution was added. The mixture was refluxed, oxidized, and filtered again. The oxidation steps were repeated 5 times. The resulting final product had a melting point ranging from about 213.5° to 219° C.

EXAMPLE III

Synthesis of the acid chloride of the product obtained in Example II

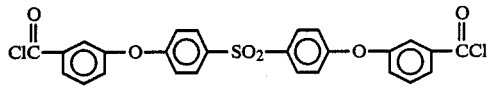

Twenty grams of the product of Example II was mixed with 61.2 grams of $SOCl_2$ in a reaction flask, fitted with a stirrer, condenser, thermometer, and dry-$N_2$ purge. The mixture was refluxed for 2 hours and the $SOCl_2$ was distilled off. 200 milliliters of benzene was added and the mixture was refluxed, cooled, and filtered to recover the raw product which was recrystallized to a powder. The powder was mixed with 200 milliliters of benzene, refluxed, and cooled to form a precipitate that had a melting range of about 115° to 118° C.

EXAMPLE IV

Synthesis of nadic dicapped benzoxazole

In a flask equipped with a nitrogen purge and a mechanical stirrer, 9.34 g (0.043 moles) of 3,3'-dihydroxybenzidine was mixed with 34.2 g pyridine and 31 g N,N'-dimethylacetamide. The mixture was stirred in an ice water bath until the mixture temperature reached 10° C. Then, 11.39 g (0.0216 moles) of bis(4-carboxyphenoxyphenylsulfone and 20.0 g (0.043 moles) 3,5' dinadicimidobenzoyl chloride in 126 g N,N'-dimethylacetamide. Stirring continued for 4 hours following completion of the addition of the reactants. A product was recovered by pouring the reaction mixture into water and blending the resulting mixture. Residual hydrochloride salts were removed from the recovered product (after filtering) by washing the product thoroughly with water before drying the product at 100° C. The yield was nearly quantitative.

EXAMPLE V

Synthesis of nadic dicapped benzoxazole

Approximately 10.6 mmoles of acid chloride terminated sulfone of Example III is mixed with about 5.3 mmoles of nadic dicapped acid chloride in methylenedichloride and a suitable base (pyridine). The resulting mixture is added with an addition funnel to a stirred slurry containing about 13.0 mmoles of a four-functional compound of the formula:

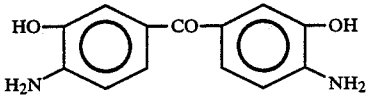

in DMAC to form a reaction mixture. After stirring for 3 hours at room temperature under an inert atmosphere, the stirring is stopped and the mixture is allowed to sit at room temperature for about 48 hours. The oligomer is recovered in methylenedichloride, and is recrystallized using petroleum ether. The oligomer is washed with petroleum ether and, then, with methanol.

While preferred embodiments have been described, those skilled in the art will recognize alterations, variations, or modifications that might be made to the embodiments without departing from the inventive concept. The description and examples, accordingly, are meant to illustrate the invention. The claims should be interpreted liberally in view of the description, and should be limited only as is necessary in view of the pertinent prior art.

We claim:

1. A crosslinkable heterocycle sulfone oligomer formed by reacting:
   (a) 2 moles of an unsaturated, crosslinking, phenylimide carboxylic acid halide of the general formula:

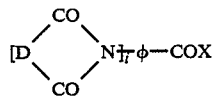

wherein D = a divalent radical that includes hydrocarbon unsaturation such that

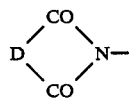

is a radical selected from the group consisting of:

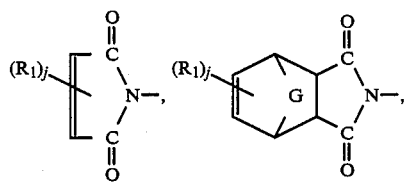

2. The oligomer of claim 1 wherein the terminal carboxylic acid halide functionalities of the diacid halide are attached at the ends of a hydrocarbon residue selected from the group consisting of:
   (a) phenyl;
   (b) naphthyl;
   (c) biphenyl;
   (d) a polyaryl divalent radical of the general formula:

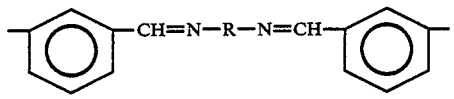

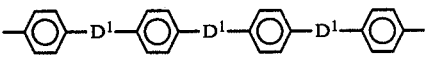

wherein $D^1 = -S-$, $-O-$, $-CO-$, $-SO_2-$, $-(CH_3)_2C-$, $-(CF_3)_2C-$, or mixtures thereof throughout the chain;

(e) a divalent radical having conductive linkages, illustrated by Schiff base compounds selected from the group consisting of:

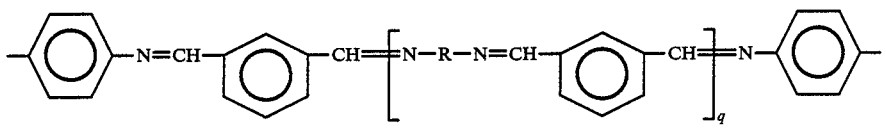

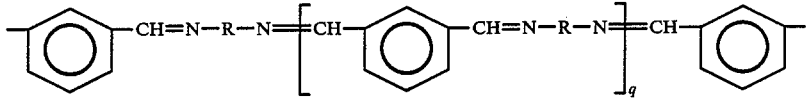

wherein R is selected from the group consisting of: phenyl; biphenyl; naphthyl; or a divalent radical of the general formula:

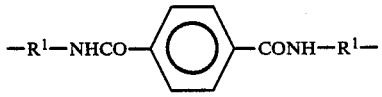

wherein $W = -SO_2-$ or $-CH_2-$; and $q = 0-4$; or
   (f) a divalent radical of the general formula:

$-R^1-NHCO-$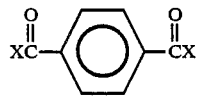$-CONH-R^1-$ wherein $R^1 = $ a $C_2$ to $C_{12}$ divalent aliphatic, alicyclic, or aromatic radical.

3. The oligomer of claim 1 wherein the diacid halide is selected from the group consisting of:

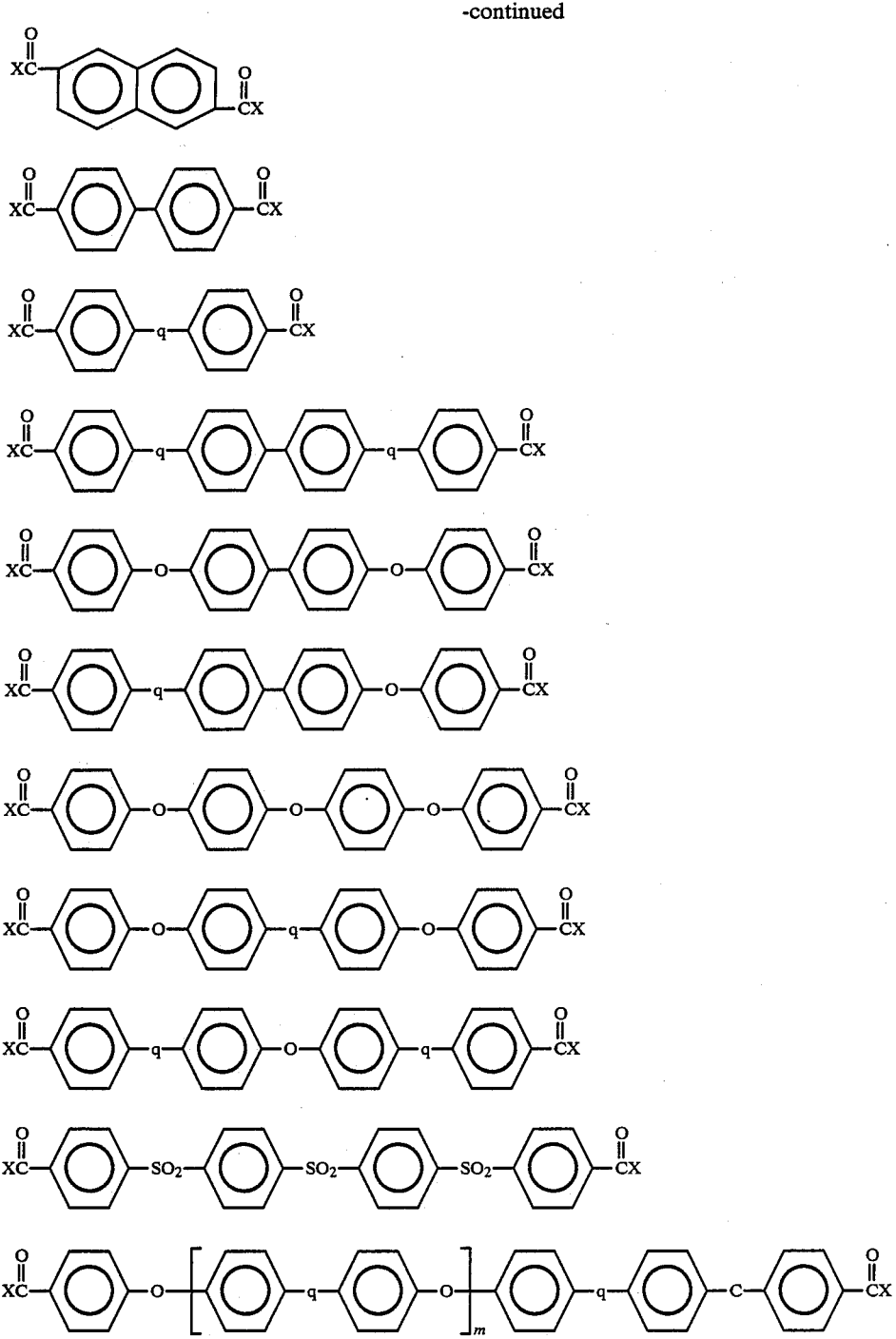
wherein
q=—SO₂—, —S—, —CO—, or —(CF₃)₂C—; and
m=0–5.
4. The oligomer of claim 3 wherein the diacid halide is
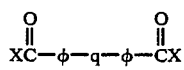
wherein φ=phenyl.
5. The oligomer of claim 1 wherein the diacid halide has the formula:
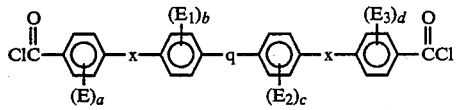
wherein q is selected from the group consisting of:
—(CF₃)₂C—, —SO₂—, —S—, or —CO—;
x is selected from the group consisting of —O— and —SO₂—; E, E₁, E₂ and E₃ each represent substituent groups selected from the group consisting of halogen, alkyl groups having 1 to 4 carbon atoms, and alkoxy groups having 1 to 4 carbon atoms; and "a", "b", "c", and "d" each is an integer having a value of 0 to 4.

6. The oligomer of claim 5 wherein q is —$SO_2$— and a=b=c=d=0.

7. A prepreg comprising the oligomer of claim 2 and a reinforcing additive in fiber or particulate form.

8. A composite formed by curing the prepreg of claim 7.

9. A composite formed by curing the oligomer of claim 2.

10. A method for making a heterocycle oligomer comprising the step of:
condensing simultaneously a mixture of (i) 2 moles of a phenylimide end-cap monomer of the general formula:

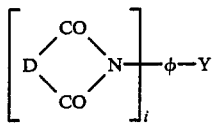

wherein D=a divalent radical that includes hydrocarbon unsaturation;

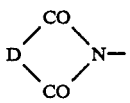

is a radical selected from the group consisting of:

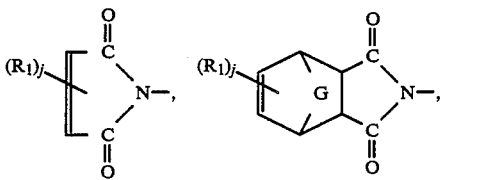

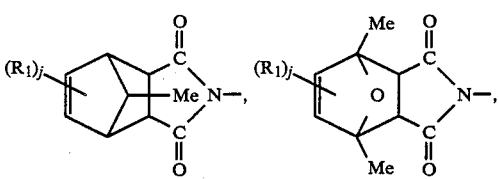

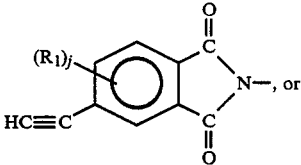

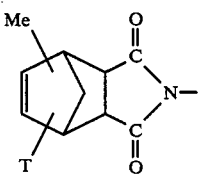

wherein
$R_1$=lower alkyl, lower alkoxy, aryl, aryloxy, substituted alkyl, substituted aryl, halogen, or mixtures thereof;
j=0, 1, or 2;
G=—$CH_2$—, —O—, —S—, or —$SO_2$—;
T=methallyl or allyl;
Me=methyl;
i=1 or 2;
$\phi$=phenyl; and
Y=—OH, —SH, or —$NH_2$,
(ii) about w moles of a four-functional compound of the general formula:

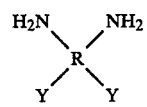

wherein R=

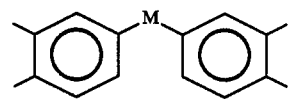

and

M=—CO—, —S—, —O—, —$SO_2$—, or —$(CF_3)_2C$—, and (iii) about (w+1) moles of a diacid halide that includes terminal carboxylic acid halide functionalities, the condensation occurring in a suitable solvent in the presence of pyridine under an inert atmosphere at ambient temperature or below.

11. The product of the process of claim 10.

12. The product of claim 11 wherein the diacid halide includes terminal carboxylic acid halide functionalities that are attached at the ends of a hydrocarbon residue selected from the group consisting of:
(a) phenyl;
(b) naphthyl;
(c) biphenyl;
(d) a polyaryl divalent radical of the general formula:

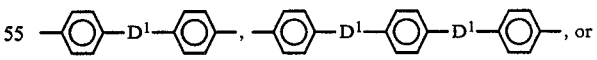

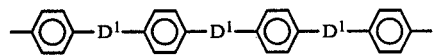

wherein
$D^1$=—S—, —O—, —CO—, —$SO_2$—, —$(CH_3)_2C$—, —$(CF_3)_2C$—, or mixtures thereof throughout the chain;
(e) a divalent radical having conductive linkages, illustrated by Schiff base compounds selected from the group consisting of:

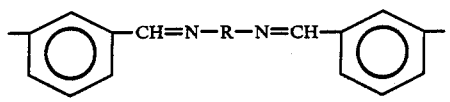

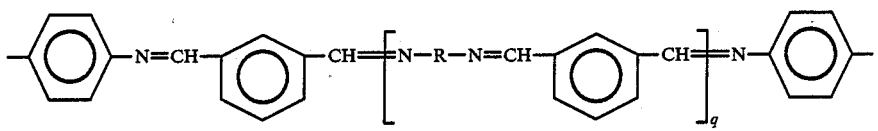

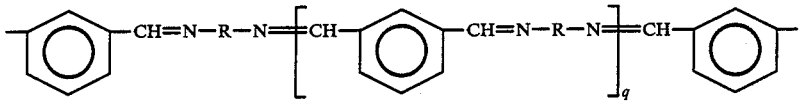

wherein
R₂ is selected from the group consisting of:
phenyl; biphenyl; naphthyl; or
a divalent radical of the general formula:

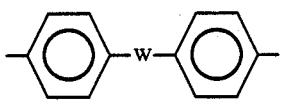

wherein
W=—SO₂—, or —CH₂—; and q=0-4; or
(f) a divalent radical of the general formula:

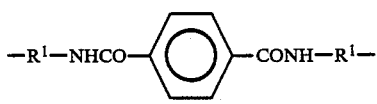

wherein
R¹=a C₂ to C₁₂ divalent aliphatic, alicyclic, or aromatic radical; and

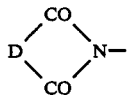

is a radical selected from the group consisting of:

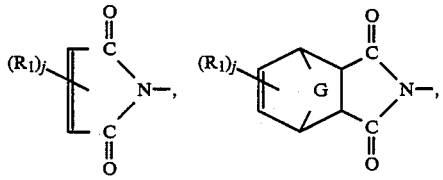

-continued

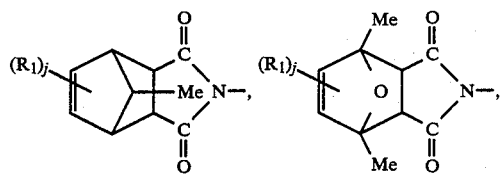

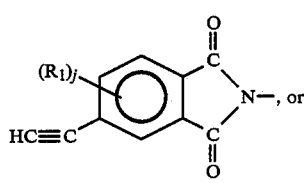

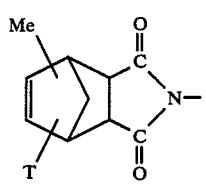

wherein
R₁=lower alkyl, lower alkoxy, aryl, aryloxy, substituted alkyl, substituted aryl, halogen, or mixtures thereof;
j=0, 1, or 2;
G=—CH₂—, —O—, —S—, or —SO₂—;
T=methallyl or allyl; and
Me=methyl.

13. The product of claim 12 wherein the diacid halide is selected from the group consisting of:

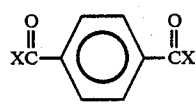

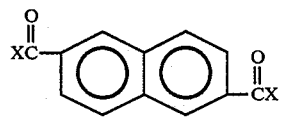

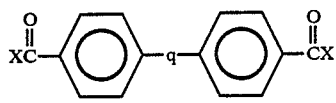

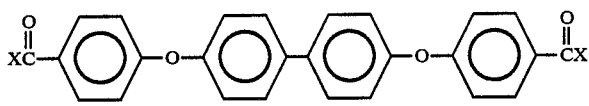

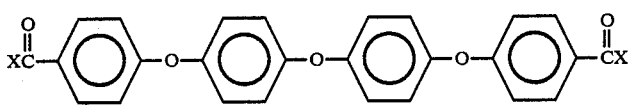

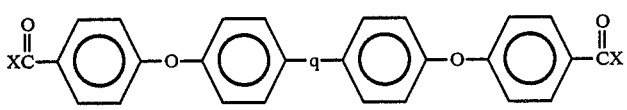

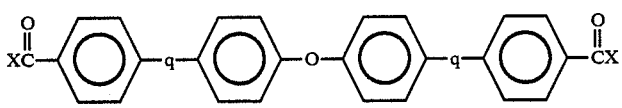

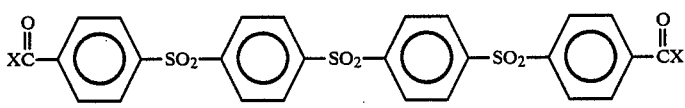

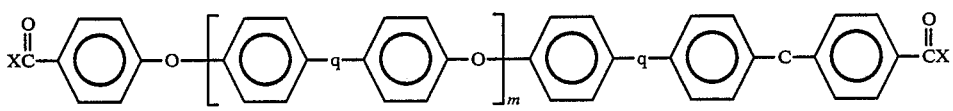

wherein
q=—SO$_2$—, —S—, —CO—, or —(CF$_3$)$_2$C—; and
m=0-5.

14. The product of claim 12 wherein Y=—OH.
15. The product of claim 12 wherein Y=—SH.
16. The product of claim 12 wherein Y=—NH$_2$.
17. A method for making a multidimensional heterocycle sulfone oligomer comprising the step of:
condensing simultaneously a mixture that includes (i) a hub of the general formula Ar(COX)$_w$ wherein Ar=any aromatic radical of valence w, X=halogen, and w=an integer greater than or equal to 3,
(ii) about w moles of a four-functional compound of the general formula:

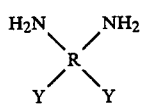

wherein Y=—OH, —SH, or —NH$_2$;

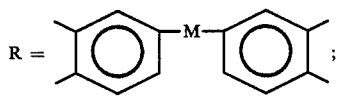

and

M=—CO—, —S—, —O—, —SO$_2$—, or —(CF$_3$)$_2$C— and (iii) about w moles of a phenylimide carboxylic acid halide of the general formula:

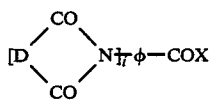

wherein
D=a divalent radical that includes hydrocarbon unsaturation;

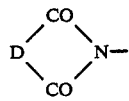

is a radical selected from the group consisting of:

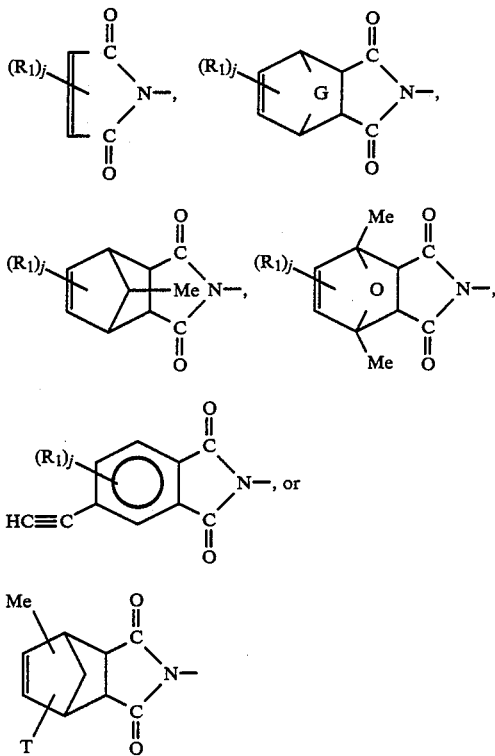

wherein
R$_1$=lower alkyl, lower alkoxy, aryl, aryloxy, substituted alkyl, substituted aryl, halogen, or mixtures thereof;
j=0, 1, or 2;
G=—CH$_2$—, —O—, —S—, or —SO$_2$—;
T=methallyl or allyl;
Me=methyl;
i=1 or 2; and
φ=phenyl,
the condensation occurring in a suitable solvent in the presence of pyridine under an inert atmosphere.

18. The method of claim 17 wherein the condensation occurs at ambient temperature or below.

19. The product of the process of claim 17.

20. The product of claim 19 wherein Y=—OH.

21. The product of claim 19 wherein Y=—SH.

22. The product of claim 19 wherein Y=—NH$_2$.

23. A heterocycle sulfone oligomer of the general formula:

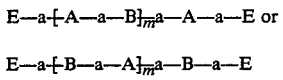

wherein E=an end-cap monomer of the general formula:

i=1 or 2;
φ=phenyl;
D=a radical selected from the group consisting of:

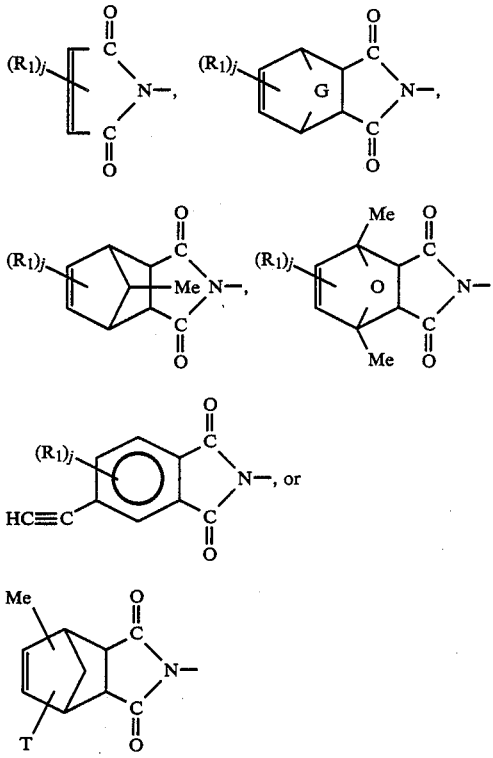

R$_1$=lower alkyl, lower alkoxy, aryl, aryloxy, substituted alkyl, substituted aryl, halogen, or mixtures thereof;
j=0, 1, 2;
G=—CH$_2$—, —O—, —S—, or —SO$_2$—;
T=methallyl or allyl;
Me=methyl;
A=

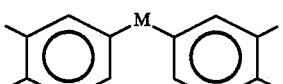

M=—CO—, —S—, —O—, —SO$_2$—, or —(CF$_3$)$_2$C—;
B=a residue of a dicarboxylic acid halide that includes the carboxylic acid halide functionalities attached to the ends of a hydrocarbon residue selected from the group consisting of:
(a) phenyl;

(b) naphthyl;
(c) biphenyl;
(d) a polyaryl divalent radical of the general formula:

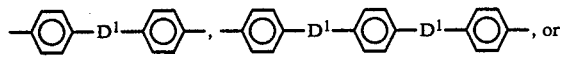, 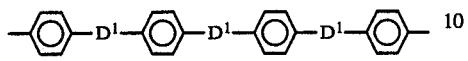

wherein
D$^1$=—S—, —O—, —CO—, —SO$_2$—, —(CH$_3$)$_2$C—, or mixtures thereof throughout the chain;
(e) a divalent radical having conductive linkages, illustrated by Schiff base compounds selected from the group consisting of:

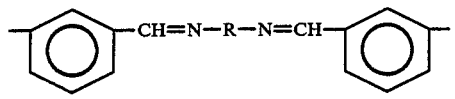

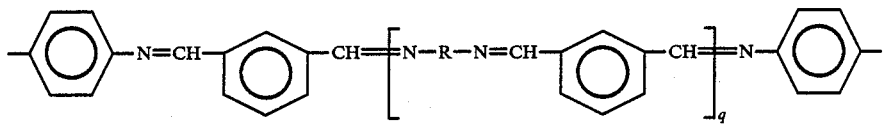

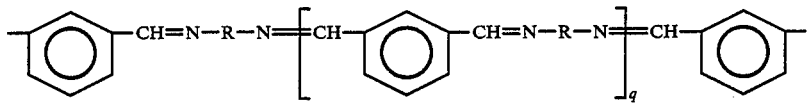

wherein
R$_2$ is selected from the group consisting of: phenyl; biphenyl; naphthyl; or a divalent radical of the general formula:

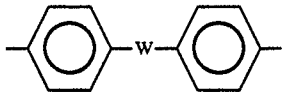

wherein
W=—SO$_2$—, or —CH$_2$—; and q=0-4; or
(f) a divalent radical of the general formula:

wherein
R$^1$=a C$_2$ to C$_{12}$ divalent aliphatic, alicyclic, or aromatic radical;
a=a heterocycle linkage selected from the group consisting of oxazole, thiazole, or imidazole; and
m=an integer so that the oligomer has an average formula weight greater than about 500;

[Structures of imide compounds shown on right side of page]

wherein
R$_1$=lower alkyl, lower alkoxy, aryl, aryloxy, substituted alkyl, substituted aryl, halogen, or mixtures thereof;
i=1 or 2
X=halogen;
j=0, 1, or 2;
G=—CH$_2$—, —O—, —S—, or —SO$_2$—;
T=methallyl or allyl; and
Me=methyl;
(b) n moles of diacid halide that includes terminal carboxylic acid halide functionalities; and
(c) n+1 moles of at least one four-functional compound of the general formula:

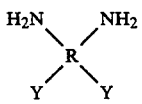

wherein R is selected from the group consisting of compounds of the general formula:

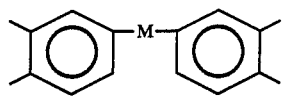

wherein
M=—CO—, —SO₂—, —(CF₃)₂C—, —S—, or —O—;
Y is selected from the group consisting of —OH, —SH, and —NH₂; and
n is selected so that the oligomer has an average formula weight greater than about 500.

24. The heterocycle sulfone oligomer of claim 23 wherein D is selected from the group consisting of:

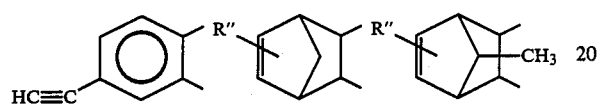

and R" is hydrogen or lower alkyl.

25. The heterocycle sulfone oligomer of claim 23 wherein B=a residue of a dicarboxylic acid halide selected from the group consisting of:

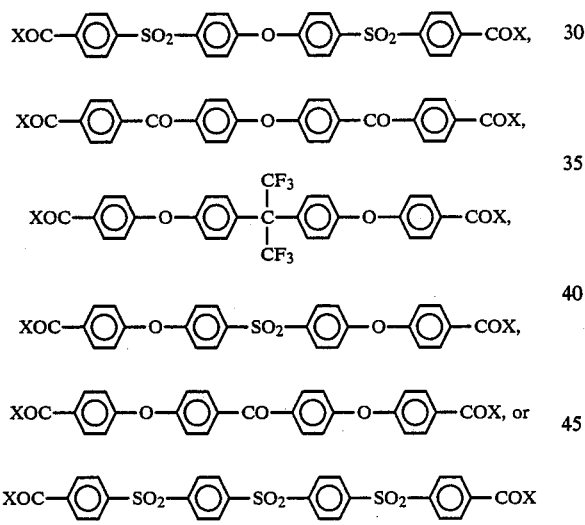

26. A method for synthesizing crosslinking heterocycle oligomers, comprising the step of reacting in a suitable solvent about 2 moles of a crosslinking phenylimide carboxylic acid halide of the general formula:

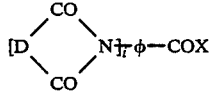

wherein
i=1 or 2;
φ=phenyl;
X=halogen; and
D=a divalent radical that includes hydrocarbon unsaturation, about n moles of a diacid halide, and n+1 moles of a four-functional compound of the general formula:

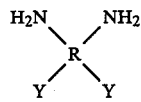

wherein
R=a radical such that each Y is on a separate carbon adjacent to an amine-substituted carbon;
Y=—OH, —SH, or —NH₂; and
n=an integer greater than or equal to 1, the reaction occurring at or below ambient temperature in the presence of pyridine.

27. The method of claim 26 wherein R has the general formula:

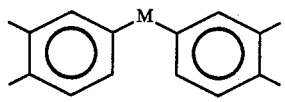

wherein M=—CO—, —S—, —O—, —SO₂—, or —(CF₃)₂C—.

28. The product of the process of claim 21.

29. An oligomer comprising the product of simultaneously reacting in a suitable solvent in the presence of pyridine under an inert atmosphere a mixture including:
(a) 2 moles of a phenylimide acid chloride having the general formula:

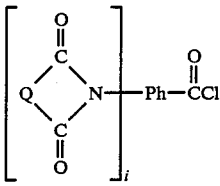

(b) n moles of a linear hydrocarbon moiety having terminal acid chloride functionalities and a plurality of aryl rings wherein at least two aryl rings are connected by a linkage selected from the group consisting of —SO₂—, —S—, —CO—, and —(CF₃)₂C—; and
(c) n+1 moles of at least one four-functional compound selected from the group consisting of:

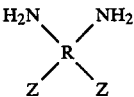

wherein R is selected from the group consisting of radicals of the general formula:

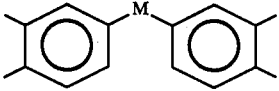

M=—CO—, —S—, —O—, —SO₂—, or —(CF₃)₂C—;
Z is selected from the group consisting of —OH, —SH, or —NH₂;
Ph=phenyl;
i=1 or 2;

n is selected so that the oligomer has a formula weight of between about 500 and about 30,000;

Q is selected from the group consisting of:

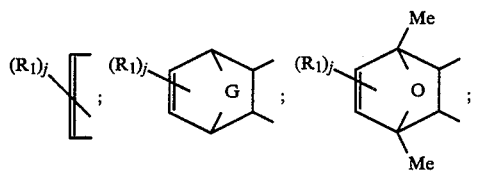

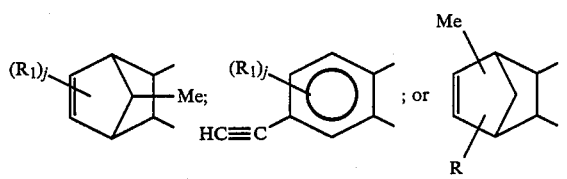

$R_1$ = lower alkyl, aryl, substituted aryl, lower alkoxy, or mixtures thereof;
$G$ = —$SO_2$—, —S—, —O—, or —$CH_2$—;
j = 0, 1, or 2;
Me = methyl; and
T = allyl or methallyl.

30. The oligomer of claim 29 wherein the linear hydrocarbon moiety is selected from compounds of the general formula:

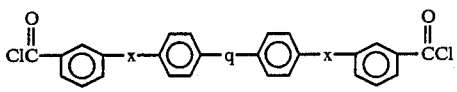

wherein
x = —O— or —$SO_2$—, and
q = —$(CF_3)_2C$—, —$SO_2$—, —S—, or —CO—.

31. The oligomer of claim 29 wherein the Z = —OH.
32. The oligomer of claim 29 wherein Z = —SH.
33. The oligomer of claim 29 wherein Z = —$NH_2$.

* * * * *

UNITED STATES PATENT AND TRADEMARK OFFICE
CERTIFICATE OF CORRECTION

PATENT NO. : 4,868,270

DATED : September 19, 1989

INVENTOR(S) : Hyman R. Lubowitz, Clyde H. Sheppard and Ronald R. Stephenson

It is certified that error appears in the above-identified patent and that said Letters Patent is hereby corrected as shown below:

Column 25, first formula from the top, should read

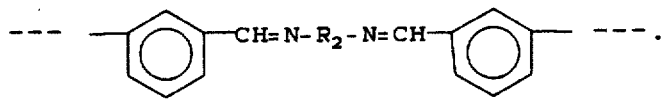

Column 25, the second formula from the top,

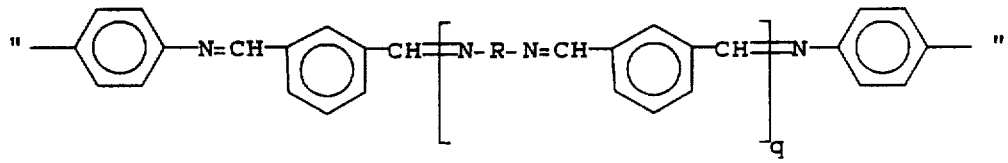

should read

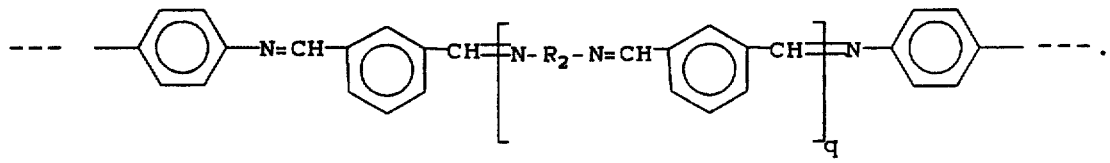

UNITED STATES PATENT AND TRADEMARK OFFICE
CERTIFICATE OF CORRECTION

PATENT NO. : 4,868,270

DATED : September 19, 1989

INVENTOR(S) : Hyman R. Lubowitz, Clyde H. Sheppard and Ronald R. Stephenson

It is certified that error appears in the above-identified patent and that said Letters Patent is hereby corrected as shown below:

Column 25, the third formula from the top,

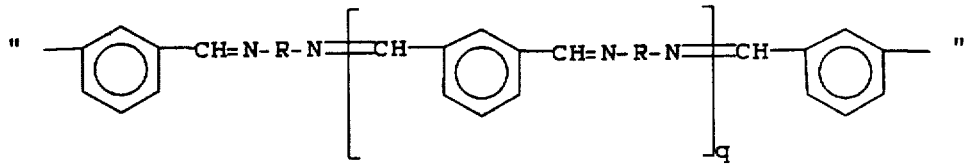

should read

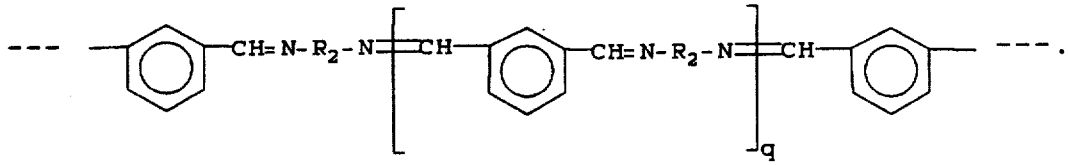

Column 27, line 64, "Ar(COX)$_w$", should read ---Ar$-$(COX)$_w$---.

UNITED STATES PATENT AND TRADEMARK OFFICE
CERTIFICATE OF CORRECTION

PATENT NO. : 4,868,270

DATED : September 19, 1989

INVENTOR(S) : Hyman R. Lubowitz, Clyde H. Sheppard and Ronald R. Stephenson

It is certified that error appears in the above-identified patent and that said Letters Patent is hereby corrected as shown below:

Column 31, line 19 should read

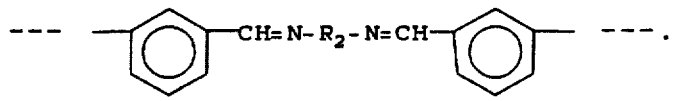

Column 31, line 20,

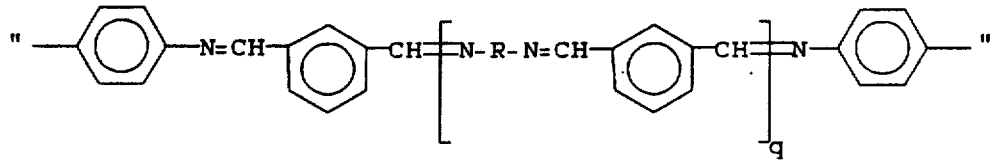

should read

UNITED STATES PATENT AND TRADEMARK OFFICE
CERTIFICATE OF CORRECTION

PATENT NO. : 4,868,270

DATED : September 19, 1989

INVENTOR(S) : Hyman R. Lubowitz, Clyde H. Sheppard and Ronald R. Stephenson

It is certified that error appears in the above-identified patent and that said Letters Patent is hereby corrected as shown below:

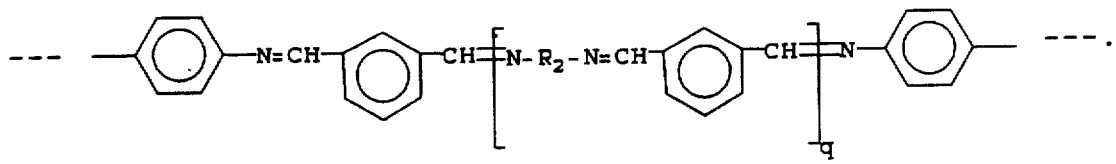

Column 31, line 21,

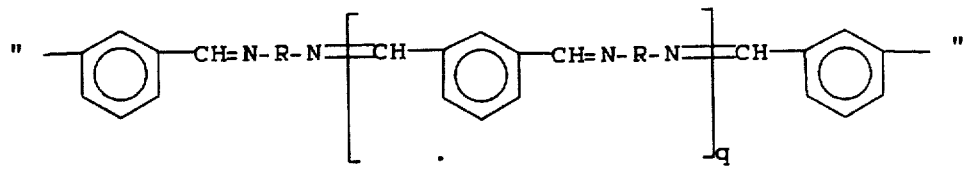

should read

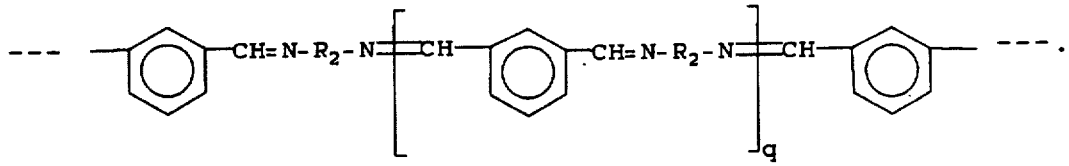

Column 31, line 68, " than about 500;" should read ---than about 500.---.

Column 32, line 1 through Column 33, line 14, should be moved to column 19, line 56.

UNITED STATES PATENT AND TRADEMARK OFFICE
CERTIFICATE OF CORRECTION

PATENT NO. : 4,868,270

DATED : September 19, 1989

INVENTOR(S) : Hyman R. Lubowitz, Clyde H. Sheppard and Ronald R. Stephenson

It is certified that error appears in the above-identified patent and that said Letters Patent is hereby corrected as shown below:

Column 33, line 17-22, Should read as is, but with more space between formula one and the R of formula two, and formula two and the R of formula three. These three are separate formulas.

Column 34, line 25, "claim 21", should read ---claim 26---.

Signed and Sealed this

Thirty-first Day of March, 1992

Attest:

HARRY F. MANBECK, JR.

Attesting Officer

Commissioner of Patents and Trademarks